(12) United States Patent
Fullerton et al.

(10) Patent No.: US 6,383,597 B1
(45) Date of Patent: May 7, 2002

(54) MAGNETIC RECORDING MEDIA WITH MAGNETIC BIT REGIONS PATTERNED BY ION IRRADIATION

(75) Inventors: Eric Edward Fullerton, Morgan Hill; Dieter Klaus Weller, San Jose, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/602,581

(22) Filed: Jun. 21, 2000

(51) Int. Cl.$^7$ ............................................. G11B 5/65
(52) U.S. Cl. .................. 428/65.3; 428/156; 428/670; 428/409; 428/694 T; 428/694 TR
(58) Field of Search ..................... 428/694 T, 697, 428/702, 900, 611, 636, 637, 655, 660, 668, 65.3, 65.7, 546, 670, 212, 694 TR, 156, 409; 427/128, 130, 331, 552, 533, 595, 597

(56) References Cited

U.S. PATENT DOCUMENTS

| | | | |
|---|---|---|---|
| 4,093,453 A | * 6/1978 | Makino et al. | 75/129 |
| 5,587,223 A | 12/1996 | White | 428/195 |
| 5,768,075 A | 6/1998 | Bar-Gadda | 360/135 |
| 5,820,769 A | 10/1998 | Chou | 216/22 |

OTHER PUBLICATIONS

Oppeneer P., Antonov, V., Kraft, T., Eschrig, H., Yaresko, A., and Perlov, A., J. Phys. Cond., Mat., 8, 1996, 5769.*
Li, N., Bruce, L., Oh–Hun, K., J. Magn. Magn. Mat., 205, 1999, 1.*
Bruenger, W., Torkler, M., Dzionk, C., Terris, B., Folks, L., Weller, D., Rothuizen, H., Vettiger, P., Stangl, G., Fallmann, W., Micro., Eng., 53, 2000, 605.*
Le Floc'h, D., Saha–Dasgupta, T., Finel, A., Comp. Mat. Sci., 8, 1997, 192.*
C. Chappert, et al., "Planar Patterned Magnetic Media Obtained by Ion Irradiation," www.sciencemag.org—Science, vol. 280, Jun. 19, 1998, pp. 1919–1922.
B. D. Terris, et al., "Ion–Beam Patterning of Magnetic Films Using Stencil Masks," Applied Physics Letters, vol. 75, No. 3, Jul. 19, 1999, pp. 403–405.

* cited by examiner

Primary Examiner—Stevan A. Resan
Assistant Examiner—Kevin M. Bernatz
(74) Attorney, Agent, or Firm—Thomas R. Berthold

(57) ABSTRACT

A patterned magnetic recording disk has a magnetic recording layer patterned into discrete magnetic and nonmagnetic regions having substantially the same chemical composition. The nonmagnetic regions have a chemically-ordered $L1_2$ crystalline structure and the magnetic regions have a chemically-disordered crystalline structure. The chemically-ordered intermetallic compound $FePt_3$, which is nonferromagnetic, is rendered ferromagnetic by ion irradiation. This $FePt_3$ material can be patterned by irradiating local regions through a mask to create magnetic regions that serve as the magnetic bits. The ions pass through the openings in the mask and impact the chemically-ordered $FePt_3$ in selected regions corresponding to the pattern of holes in the mask. The ions disrupt the ordering of the Fe and Pt atoms in the unit cell and transform the $FePt_3$ into magnetic regions corresponding to the mask pattern, with the regions of the film not impacted by the ions retaining their chemically-ordered structure.

7 Claims, 4 Drawing Sheets

● Fe
○ Pt

MAGNETIC RECORDING MEDIA WITH MAGNETIC BIT REGIONS PATTERNED BY ION IRRADIATION

TECHNICAL FIELD

This invention relates generally to magnetic recording media, and more particularly to patterned magnetic recording disks with discrete magnetic regions or islands.

BACKGROUND OF THE INVENTION

Conventional magnetic recording disks in hard disk drives typically use a continuous granular magnetic film, such as a sputter-deposited hexagonal-close-packed (HCP) cobalt-platinum (CoPt) alloy, as the recording medium. Each magnetic bit in the medium is comprised of many small magnetized grains.

The challenge of producing continuous granular films as magnetic media will grow with the trend toward higher areal storage densities. Reducing the size of the magnetic bits while maintaining a satisfactory signal-to-noise ratio, for example, requires decreasing the size of the grains. Unfortunately, significantly reducing the size of weakly magnetically coupled magnetic grains will make their magnetization unstable at normal operating temperatures. To postpone the arrival of this fundamental "superparamagnetic" limit and to avert other difficulties associated with extending continuous granular media, there has been renewed interest in patterned magnetic media.

With patterned media, the continuous granular magnetic film that covers the disk substrate is replaced by an array of spatially separated discrete magnetic regions or islands, each of which serves as a single magnetic bit. The primary approach for producing patterned media has been to selectively deposit or remove magnetic material from a magnetic layer on the substrate so that magnetic regions are isolated from one another and surrounded by areas of nonmagnetic material. There are a variety of techniques for the selective deposition or removal of magnetic material from a substrate. In one technique the substrate is covered with a lithographically patterned resist material and a magnetic film is deposited to cover both the areas of resist and the areas of exposed substrate. The resist is dissolved to lift off the magnetic film that covers it, leaving an array of isolated magnetic regions. An alternative technique is to first deposit a magnetic film on the substrate and then pattern resist material on the magnetic film itself. Magnetic material from the areas not protected by the resist can then be selectively removed by well-known processes. Examples of patterned magnetic media made with these types of lithographic processes are described in U.S. Pat. Nos. 5,587,223; 5,768,075 and 5,820,769.

From a manufacturing perspective, an undesirable aspect of the process for patterning media that requires the deposition or removal of material is that it requires potentially disruptive processing with the magnetic media in place. Processes required for the effective removal of resists and for the reliable lift-off of fine metal features over large areas can damage the material left behind and therefore lower production yields. Also, these processes must leave a surface that is clean enough so that the magnetic read/write head supported on the air-bearing slider of the disk drive can fly over the disk surface at very low flying heights, typically below 30 nanometers (nm).

An ion-irradiation patterning technique that avoids the selective deposition or removal of magnetic material, but uses a special type of perpendicular magnetic recording media, is described by Chappert et al, "Planar patterned magnetic media obtained by ion irradiation", Science, Vol. 280, Jun. 19, 1998, pp. 1919–1922. In this technique Pt—Co—Pt multilayer sandwiches which exhibit perpendicular magnetocrystalline anisotropy are irradiated with ions through a lithographically patterned mask. The ions mix the Co and Pt atoms at the layer interfaces and substantially reduce the perpendicular magnetocrystalline anisotropy of the film, with the result that the regions of the disk that are not irradiated retain their perpendicular magnetic properties and serve as the magnetic bits.

Chemically-ordered alloys of FePt and CoPt formed as thin films have also been proposed for horizontal magnetic recording media. Chemically-ordered alloys of FePt and CoPt, in their bulk form, are known as tetragonal $L1_0$-ordered phase materials (also called CuAu materials). They are known for their high magnetocrystalline anisotropy and magnetic moment, properties that are also desirable for high-density magnetic recording media. The c-axis of the $L1_0$ phase is similar to the c-axis of HCP CoPt alloys in that both are the easy axis of magnetization. An ion-irradiated patterned disk that uses a continuous magnetic film of a chemically-ordered Co (or Fe) and Pt (or Pd) alloy with a tetragonal crystalline structure is described in IBM's pending application Ser. No. 09/350,803 filed Jul. 9, 1999. The ions cause disordering in the film and produce regions in the film that are low coercivity or magnetically "soft" and have no magnetocrystalline anisotropy, so that the regions of the disk that are not irradiated retain their horizontal magnetic properties and serve as the magnetic bits.

One disadvantage of the Chappert et al. and IBM ion-irradiated patterned disks is that the regions separating the discrete magnetic regions from one another are not completely nonmagnetic, but still have some magnetic properties. Thus the magnetoresistive read head in the disk drive will detect noise and/or some type of signal from these regions. In addition, in these ion irradiation techniques the disk before ion-irradiation is ferromagnetic so that the regions of the disk that are not ion-irradiated become the regions that serve as the magnetic bits. This requires the use of a mask that is difficult to fabricate because the holes in the mask are used to generate corresponding nonmagnetic regions on the disk.

What is needed is a patterned magnetic recording disk that has discrete magnetic regions separated by completely nonmagnetic regions so that only the magnetic regions contribute to the read signal, and that is made by a patterning technique where the mask pattern of holes matches the pattern of discrete magnetic regions of the disk that serve as the magnetic bits.

SUMMARY OF THE INVENTION

The present invention is a magnetic recording disk wherein the magnetic recording layer is patterned into discrete magnetic and nonmagnetic regions having substantially the same chemical composition, but wherein the nonmagnetic regions have a chemically-ordered $L1_2$ crystalline structure and the magnetic regions having a chemically-disordered crystalline structure. The invention is based on the discovery that the chemically-ordered intermetallic compound $FePt_3$, which is nonferromagnetic, can be rendered ferromagnetic by ion irradiation. With a clear transformation from nonferromagnetic to ferromagnetic, this $FePt_3$ material can be patterned by irradiating local regions through a mask to create magnetic regions that serve as the magnetic bits. The ions pass through the openings in the mask and impact the chemically-ordered $FePt_3$ in selected regions corresponding to the pattern of holes in the mask. The ions disrupt the ordering of the Fe and Pt atoms in the unit cell and transform the $FePt_3$ into magnetic regions corresponding to the mask pattern, with the regions of the film not impacted by the ions retaining their chemically-ordered structure. The coercivity of the magnetic regions in the patterned media can be increased by slightly altering the 3:1 ratio of Pt to Fe by increasing the amount of Fe or by adding a third element, such as small amounts of cobalt (Co) and/or nickel (Ni), during the sputter deposition of the $FePt_3$ film.

For a fuller understanding of the nature and advantages of the present invention, reference should be made to the following detailed description taken together with the accompanying figures.

DETAILED DESCRIPTION OF THE INVENTION

Figure 1A:
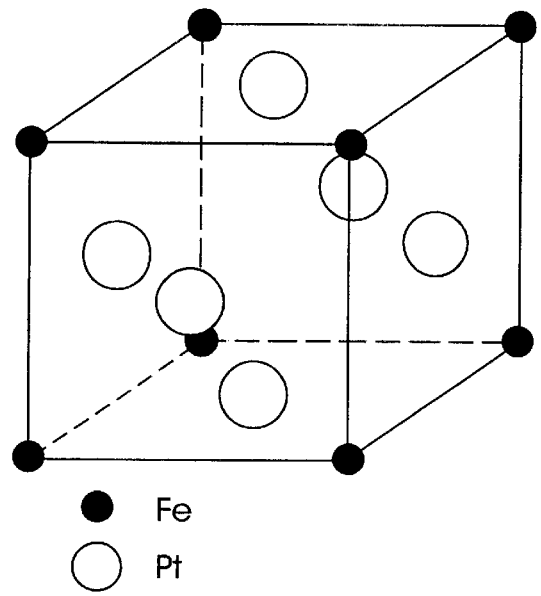
FIG. 1A is a schematic drawing of the unit cells of the chemically-ordered $L1_2$ (or $AuCu_3$) structure of $FePt_3$.
Figure 1B:
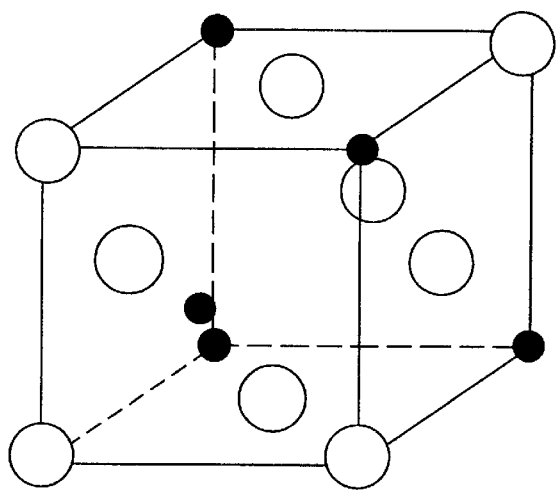
FIG. 1B is a schematic drawing of the unit cells of the disordered face centered cubic (fcc) structure of $FePt_3$.

The intermetallic compounds $XPt_3$, such as $FePt_3$, form an $L1_2$ structure (also known as the $AuCu_3$ structure) in the chemically-ordered phase and a randomly substituted face-centered-cubic (fcc) structure in the chemically disordered phase, as shown in FIGS. 1A–1B. In the chemically-ordered phase (FIG. 1A), the corners of the unit cell are occupied with metallic X atoms and the face centers are occupied with the larger Pt atoms. As shown in FIG. 1A, there are 8 Fe atoms at the corners and 6 Pt atoms at the faces of a single unit cell. However, in the bulk material, each Fe corner atom is shared by 8 neighboring cell corners and each Pt face centered atom is shared by only 2 neighboring cell faces, so that the 1:3 ratio of Fe to Pt is maintained. In the chemically-disordered phase (FIG. 1B), the corner and face center positions are generally randomly occupied with Pt or X atoms, with the same ratio of Pt to X atoms of 3:1.

The magnetic properties of $FePt_3$ vary dramatically depending on whether the compound is chemically ordered or disordered. It is known that the chemically-ordered $L1_2$ phase of $FePt_3$ is paramagnetic (no remanent magnetic moment) at room temperature and that this phase is antiferromagnetic (AF) at low temperature. The present invention is based on the discovery that the chemically-disordered phase of $FePt_3$ created by ion irradiation of the chemically-ordered phase is ferromagnetic with a magnetic moment-per-atom for Fe of 2 Bohr magnetron ($\mu_B$).

Ordered $FePt_3$ alloy films were grown epitaxially on MgO (110) and (100) substrates and textured on SiN coated Si wafers. The $FePt_3$ films were grown by co-sputtering of Fe and Pt in a 1:3 ratio. The substrates were mounted on a substrate plate heated to 750° C. during deposition, although the substrate itself is somewhat cooler. Evidence for the existence of the chemically-ordered structure is found from X-ray diffraction (XRD) and inferred from magnetic measurements. The ordered $L1_2$ phase has tetragonal point symmetry and thus the out-of-plane XRD spectrum shows that (110) and (330) peaks are present. The ordered $FePt_3$ films did not display any room-temperature ferromagnetism, as measured by either SQUID magnetometry or Kerr effect measurements. To confirm that the $FePt_3$ films were the $L1_2$ phase, $FePt_3$/Co bilayers were grown to determine if the $FePt_3$ had the expected AF property. When cooled below 170° K., the bilayer structure was exchange-biased, as would be expected for an AF/ferromagnetic structure like $FePt_3$/Co.

Figure 2:
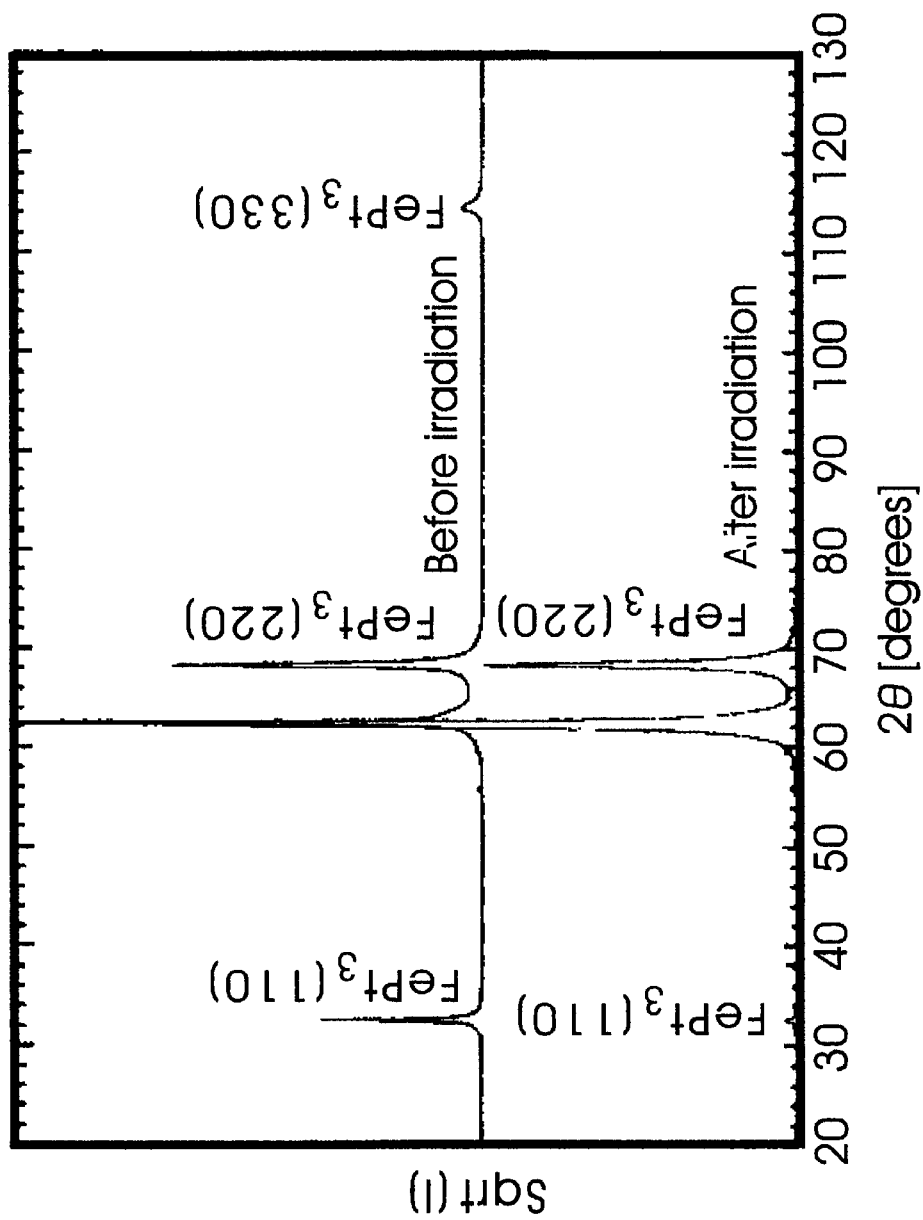
FIG. 2 is an X-ray diffraction (XRD) scan of the ordered $FePt_3$ sample before irradiation and after irradiation with N+ ions.

In the present invention it was discovered that the $FePt_3$ chemically-ordered $L1_2$ film could be rendered ferromagnetic by ion irradiation. FIG. 2 shows the XRD scan of the ordered $FePt_3$ sample before irradiation and after irradiation with N+ ions at 700 keV at a dose of $2\times10^{16}$ ions/$cm^2$. The ordered $FePt_3$ (110) peak is reduced by two orders of magnitude and the (330) peak is reduced to background. The ordered phase is reduced to less than 1% of the original volume. Even though the chemical order of the Fe and Pt is disrupted, the crystallographic order is maintained. Magnetic hysteresis loop measurements were made on the irradiated $FePt_3$ samples at room temperature and 40° K. In-plane magnetic remanence was observed, indicating the disordering caused by the ion irradiation has rendered the films ferromagnetic.

With a clear transformation from nonmagnetic to ferromagnetic, this $FePt_3$ material is well suited for patterning by irradiating local regions to create magnetic regions to serve as the magnetic bits. In the preferred patterning method, a stencil mask is irradiated with nitrogen ions (N+) at 700 keV and the ions are selectively transmitted through the mask. The ions pass through the openings in the mask and impact the ordered $FePt_3$ in selected regions corresponding to the pattern of holes in the mask. The ions disrupt the ordering of the Fe and Pt atoms in the unit cell and transform the $FePt_3$ into magnetic regions corresponding to the mask pattern, with the regions of the film not impacted by the ions retaining their ordered structure.

Figure 3:
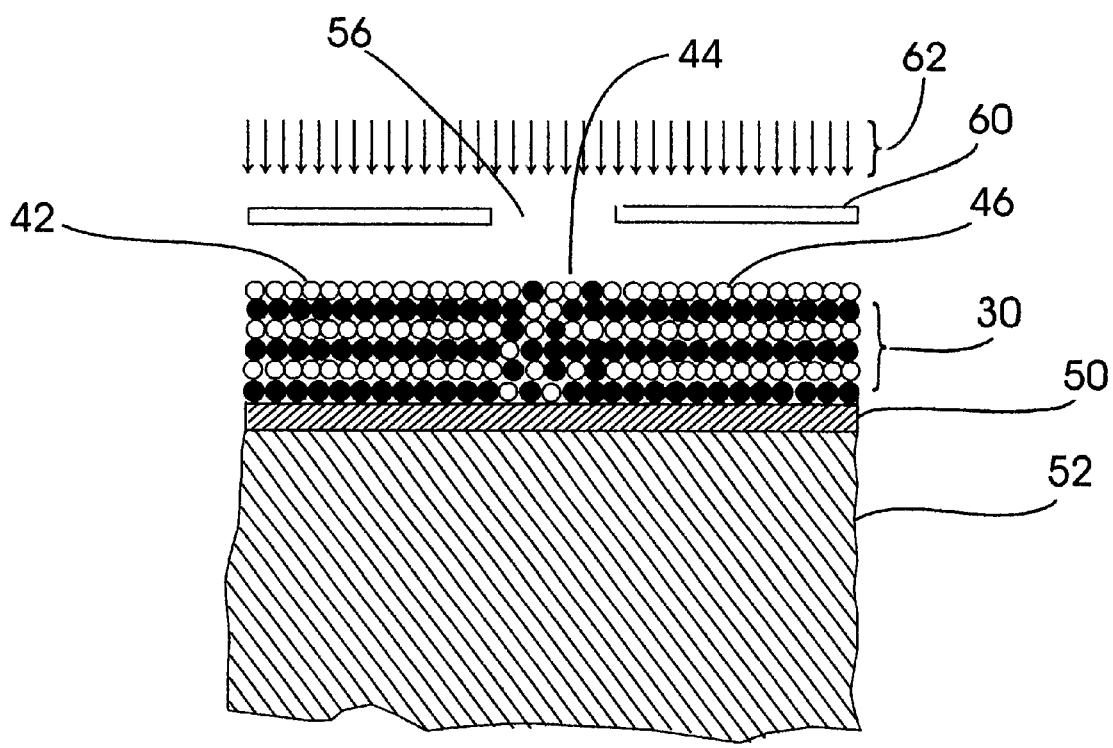
FIG. 3 is a schematic illustration of a discrete chemically-disordered magnetic $FePt_3$ region separated by chemically-ordered nonmagnetic $FePt_3$ regions, the magnetic region being formed by ion irradiation through a non-contact stencil mask.

FIG. 3 illustrates the process schematically, wherein magnetic 44 and nonmagnetic 42, 46 regions of the film 30. The $FePt_3$ film 30 is formed on a SiN seed layer 50 on silicon substrate 52. The film 30 remains chemically-ordered in the $L1_2$ phase and thus nonferromagnetic in the regions 42, 46 that are not aligned with a hole in the silicon stencil mask 60. In the region 44 of film 30 that is aligned with a hole 56 in mask 60, disordering has occurred, and region 44 is now ferromagnetic. The irradiated ions have disrupted the $L1_2$ chemical ordering so that the crystalline structure is now fcc, with the Fe and Pt atoms randomly distributed at the corners and face centers of the fcc unit cell. (See FIGS. 1A–1B). The film 30 after patterning has the same chemical composition ($FePt_3$) in both the magnetic and nonmagnetic regions, with the only structural difference in the two types of regions being the crystallographic unit cells.

The stencil mask 60 is a non-contact mask that comprises a wafer, such as silicon, with holes etched through it. The ions, depicted by arrows 62, are transmitted through the holes in the wafer. The silicon stencil mask was fabricated from a commercial silicon-on-insulator (SOI) wafer with a 10 µm-thick top side silicon layer, 0.5 µm of SOI oxide, and a 500 µm thick silicon carrier substrate. The stencil holes were first patterned by optical lithography and then transferred into the 10 μm-thick Si layer by SF$_6$-based, high aspect ratio reactive ion etching (RIE) with the SOI oxide serving as a reliable etch stop. Windows were then etched from the back side through the carrier substrate, using a similar RIE process, and the remaining SOI oxide was removed with a wet HF etch. The resulting silicon membrane is approximately 10 μm thick and covers an area of 1×1 mm. The holes in the membrane are nominally 1 μm in diameter, although somewhat irregular in shape, and are replicated throughout its area with a regular spacing of 1 to 10 μm. In making the patterned media, two such stencil masks can be aligned with their holes overlapping to create holes with effective diameters in the range of 100 nm. However, it is possible to fabricate a single stencil mask in this manner, with much smaller holes in the sub-100 nm range, to produce patterned media with the desired areal density. A detailed description of the use of stencil masks for ion-beam patterning is described by B. D. Terris et al., "Ion-beam patterning of magnetic films using stencil masks", *Appl Phys. Lett.*, Vol. 75, No. 3, Jul. 19, 1999, which is incorporated herein by reference. In the preferred embodiment the mask has holes formed in a pattern to form a magnetic recording disk with concentric circular tracks, with each track having discrete magnetic regions spaced along it to serve as the individually recordable magnetic bits.

It has been determined experimentally that a dose of at least $5 \times 10^{15}$ ions/cm$^2$ of N+ ions at 700 keV is sufficient to convert the FePt$_3$ to the chemically-disordered ferromagnetic phase. While nitrogen ions were used, other ion species that may be used include ions of He, Ar, Ne, Kr and Xe. The voltage and dosage of the ion irradiation required to achieve the desired disruption of the chemically-ordered FePt$_3$ can be determined experimentally.

Figure 4:
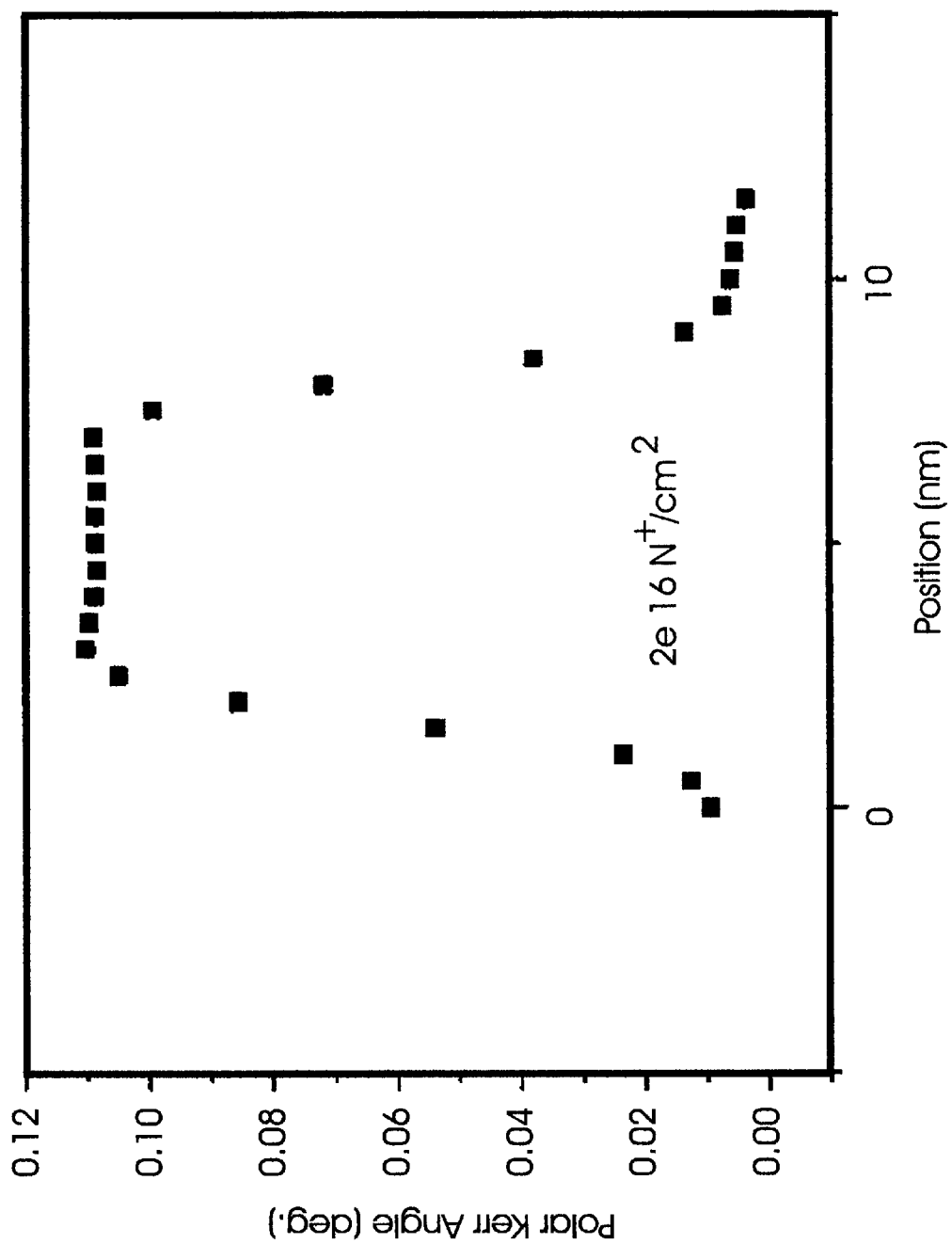
FIG. 4 is a scan with a magneto-optical Kerr looper system across a chemically-ordered $FePt_3$ sample that was patterned with N+ ions.

The ferromagnetic property of the ion-irradiated region is shown by FIG. 4, where a region of a textured FePt$_3$ film on SiN has been ion-irradiated. The sample was then scanned using a Kerr magnetometer. Away from the irradiated area, the signal level is in the background of the instrument and then increases in the region irradiated.

The preferred method for patterning the media with ion irradiation is by a non-contact mask, such as the silicon stencil mask described above. However, it is also possible to use conventional lithography, where a photoresist is formed on the AF-coupled layer and then patterned to expose openings aligned with portions of the FePt$_3$ layer intended to become the magnetic bit regions that are separated or isolated from the nonmagnetic regions.

If it is desired to increase the coercivity of the magnetic regions in the patterned media, the 3:1 ratio of Pt to Fe can be slightly altered by increasing the amount of Fe or by adding a third element, such as small amounts of cobalt (Co) and/or nickel (Ni), during the sputter deposition of the FePt$_3$ film. For example, it is known from phase diagrams that a Fe(30 to 15 atomic %)-Pt(55 to 85 atomic %) film has a L1$_2$ crystalline structure. Thus, such a slightly modified FePt$_3$ film would still have a substantially L1$_2$ chemical ordering and would be nonmagnetic before ion-irradiation. Also, it may be possible to substitute palladium (Pd) for a small portion of the Pt, provided the L1$_2$ chemically-ordered phase is maintained and provided the desired ferromagnetic properties of the chemically-disordered phase are obtained upon ion irradiation.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording medium comprising:
   a substrate; and
   a film formed on the substrate and patterned into discrete magnetic and nonmagnetic regions having the same chemical composition, the nonmagnetic regions having a chemically-ordered crystalline structure of said composition and the magnetic regions having a chemically-disordered crystalline structure of said composition.

2. The medium of claim 1 wherein the nonmagnetic regions of the film have a substantially L1$_2$ crystalline structure.

3. The medium of claim 1 wherein the Fe is present in the film in an amount of between 15 and 45 atomic percent.

4. The medium of claim 1 wherein the film further comprises one or more of Co and Ni.

5. A patterned magnetic recording disk for horizontal magnetic recording comprising:
   a disk substrate; and
   a film consisting essentially of the intermetallic compound FePt$_3$ formed on the substrate and patterned into discrete magnetic and nonmagnetic regions, the nonmagnetic regions having a substantially chemically-ordered L1$_2$ crystalline structure and the magnetic regions having a chemically-disordered face-centered-cubic crystalline structure.

6. The disk of claim 5 wherein the Fe is present in the film in an amount of between 15 and 45 atomic percent.

7. The disk of claim 5 wherein the film further comprises one or more of Co and Ni.

* * * * *